(12) United States Patent
Hernandez et al.

(10) Patent No.: US 8,832,236 B2
(45) Date of Patent: Sep. 9, 2014

(54) METHODS, APPARATUS AND ARTICLES OF MANUFACTURE TO REPLACE FIELD DEVICES IN PROCESS CONTROL SYSTEMS

(75) Inventors: Cheyenne Hernandez, New Manila Quezon City (PH); David R. Denison, Austin, TX (US); Brandon Hieb, Cedar Park, TX (US); Gary Law, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 514 days.

(21) Appl. No.: 12/819,851

(22) Filed: Jun. 21, 2010

(65) Prior Publication Data

US 2011/0313547 A1    Dec. 22, 2011

(51) Int. Cl.
*G06F 15/177* (2006.01)
*G05B 19/04* (2006.01)

(52) U.S. Cl.
USPC ........................................ 709/220; 318/568.2

(58) Field of Classification Search
USPC .......................................................... 709/220
See application file for complete search history.

(56) References Cited

U.S. PATENT DOCUMENTS

| | | | |
|---|---|---|---|
| 5,521,588 A | 5/1996 | Kuhner et al. | |
| 7,490,233 B1 * | 2/2009 | Xia | 713/1 |
| 2003/0061384 A1 * | 3/2003 | Nakatani | 709/245 |
| 2003/0079001 A1 * | 4/2003 | Chamberlain | 709/220 |
| 2008/0303472 A1 * | 12/2008 | John et al. | 318/568.2 |
| 2010/0049837 A1 * | 2/2010 | Ji | 709/220 |
| 2010/0131794 A1 * | 5/2010 | Zheng et al. | 714/6 |
| 2012/0284374 A1 * | 11/2012 | Deutsch et al. | 709/220 |

FOREIGN PATENT DOCUMENTS

| | | |
|---|---|---|
| GB | 2 355 082 | 4/2001 |
| GB | 2 363 872 | 1/2002 |
| GB | 2 367 670 | 4/2002 |
| WO | 2007121218 | 10/2007 |
| WO | 2009110968 | 9/2009 |

OTHER PUBLICATIONS

Intellectual Property Office, UK Search Report issued in connection with application serial No. GB1109452.1, mailed on Oct. 7, 2011, 4 pages.

* cited by examiner

*Primary Examiner* — Hamza Algibhah
*Assistant Examiner* — James Edwards
(74) *Attorney, Agent, or Firm* — Hanley, Flight and Zimmerman, LLC (57) ABSTRACT

Example methods, apparatus and articles of manufacture to replace field devices in process control systems are disclosed. A disclosed example method includes recording, at a first process controller of a process control system, configuration data sent from a configuration subsystem of the process control system to a first field device to commission the first field device, detecting, at a second process controller of the process control system, replacement of the first field device with a second field device, and sending the recorded configuration data from the second process controller to the second field device when the replacement is detected to commission the second field device.

19 Claims, 6 Drawing Sheets

METHODS, APPARATUS AND ARTICLES OF MANUFACTURE TO REPLACE FIELD DEVICES IN PROCESS CONTROL SYSTEMS

FIELD OF THE DISCLOSURE

This disclosure relates generally to process control systems and, more particularly, to methods, apparatus and articles of manufacture to replace field devices in process control systems.

BACKGROUND

During the lifecycle of a process control system, deployed field devices may need to be replaced. Conventional field device replacement processes requires a configuration engineer in a control room to coordinate with field maintenance staff to reconcile the physical field device with a logical device configured in the process control system. The maintenance staff replaces the physical field device and the configuration engineer decommissions and re-commissions the equivalent logical device before and after the field device is replaced, respectively.

SUMMARY

Example methods, apparatus and articles of manufacture to replace field devices in process control systems are disclosed. A disclosed example method includes recording, at a first process controller of a process control system, configuration data sent from a configuration subsystem of the process control system to a first field device to commission the first field device, detecting, at a second process controller of the process control system, replacement of the first field device with a second field device, and sending the recorded configuration data from the second process controller to the second field device when the replacement is detected to commission the second field device.

A disclosed example process controller of a process control system includes a recorder to record configuration data sent to a first field device by a configuration subsystem of the process control system to commission the first field device, a logical device to detect replacement of the first field device with a second field device, and a replacement manager to send the recorded configuration data to the second field device when the replacement is detected to commission the second field device.

Also disclosed is an example tangible article of manufacture storing machine-readable instructions that, when executed, cause a process controller of a process control system to record configuration data sent to a first field device by a configuration subsystem of a process control system to commission the first field device, detect replacement of the first field device with a second field device, and send the recorded configuration data to the second field device when the replacement is detected to commission the second field device.

DETAILED DESCRIPTION

Conventional processes to replace field devices of process control systems are user intensive, error-prone and dependent on the availability of the configuration capabilities of the process control systems. In general, the example apparatus, methods, and articles of manufacture described herein may be used to automatically configure and/or commission replacement field devices without the need for user intervention or relying on the availability of configuration system(s). In particular, configuration commands, data and/or information sent by the configuration subsystem(s) (or third party components) to a field device and response information received from the field device during field device commissioning are recorded. The recorded configuration and response information is saved in a device replacement record, which represents the information needed to configure a replacement for the field device and to verify the configuration of a replacement field device. A process controller may record the configuration information as it is received from the configuration subsystem(s) and record the response information returned from the field device to the configuration subsystem(s). Device replacement records may be stored in the process controller. Because different field devices may use different configuration and/or response data structures, device replacement records may be stored opaquely in their native format. In other words, the configuration information may be stored without modification, translation and/or interpretation, thus, obviating any need for the process controller to understand and/or be able to interpret the configuration information. When a replacement field device is connected to and/or detected by the process controller, automatic configuration of the replacement field device may be initiated without consulting the configuration subsystem(s). The process controller may locate and retrieve a corresponding device replacement record, and playback the recorded configuration information to commission, configure and/or otherwise setup the replacement field device. The recorded response information may be used to ascertain whether the configuration of the replacement field device is successful. Users may be subsequently notified whether the replacement device was successfully configured or if a configuration failure and/or problem had occurred. In some examples, a first process controller may record the initial configuration and response information, and a second process controller may detect and commission the replacement field device. In such examples, the second process controller queries the first process controller for the recorded configuration and response information for the replacement field device when the recorded information is not locally available at the second process controller.

Figure 1:
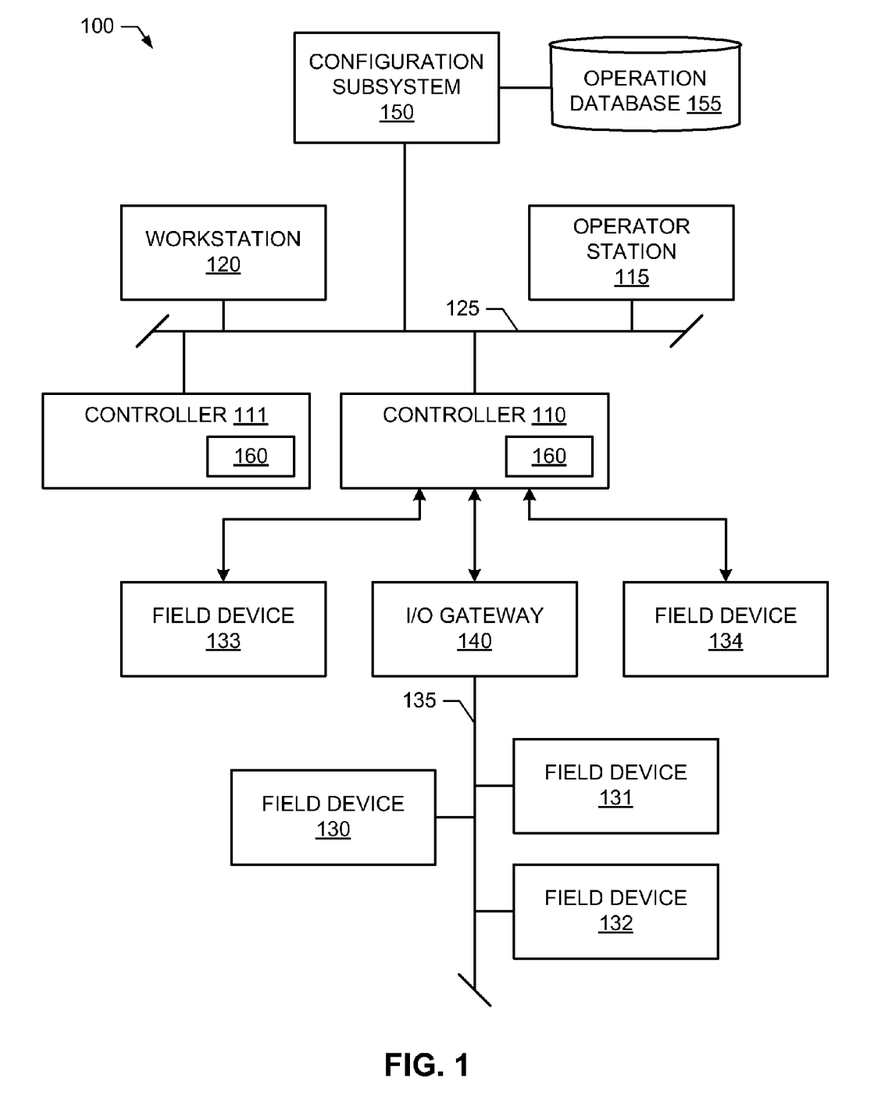
FIG. 1 is a schematic illustration of an example process control system constructed in accordance with the teachings of this disclosure.

FIG. 1 is a schematic illustration of an example process control system 100. In the interest of brevity and clarity, throughout the following descriptions references will be made to the example process control system 100 of FIG. 1. However, the methods, apparatus and articles of manufacture described herein to replace field devices are applicable to other process control systems. The example process control system 100 of FIG. 1 includes one or more process controllers (two of which are designated at reference numerals 110 and 111), one or more operator stations (one of which is designated at reference numeral 115), and one or more workstations (one of which is designated at reference numeral 120). The example process controllers 110 and 111, the example operator station 115 and the workstation 120 are communicatively coupled via a bus and/or local area network (LAN) 125, which is commonly referred to as an application control network (ACN).

The example operator station 115 of FIG. 1 allows a process plant operator to review and/or operate one or more operator display screens and/or applications that enable the process plant operator to view process plant variables, view process plant states, view process plant conditions, view process plant alarms, and/or to change process plant settings (e.g., set points and/or operating states, clear alarms, silence alarms, etc.). Such screens and/or applications are typically designed and/or implemented by process configuration engineers.

The example workstation 120 of FIG. 1 may be configured as an application station to perform one or more information technology applications, user-interactive applications and/or communication applications. For example, the workstation 120 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 115 and the example workstation 120 of FIG. 1 may be implemented using one or more workstations and/or any other suitable computer systems and/or processing systems. The operator station 115 and/or workstation 120 could, for example, be implemented using single processor personal computers, single or multi-processor workstations, etc.

The example LAN 125 of FIG. 1 may be implemented using any desired communication medium and protocol. For example, the LAN 125 may be based on a wired and/or wireless Ethernet communication scheme. However, as will be readily appreciated by those having ordinary skill in the art, any other suitable communication medium(s) and/or protocol(s) could be used. Further, although a single LAN 125 is illustrated in FIG. 1, more than one LAN and/or other alternative pieces of communication hardware may be used to provide redundant communication paths within the example system 100 of FIG. 1.

The example controller 110 of FIG. 1 is coupled to a plurality of smart field devices 130, 131 and 132 via a digital data bus 135 and an input/output (I/O) gateway 140. The smart field devices 130-132 may be Fieldbus compliant valves, actuators, sensors, etc., in which case, the smart field devices 130-132 communicate via the digital data bus 135 using the well-known Foundation Fieldbus protocol. Of course, other types of smart field devices and communication protocols could be used instead. For example, the smart field devices 130-132 could instead be Profibus and/or HART compliant devices that communicate via the data bus 135 using the well-known Profibus and HART communication protocols. Additional I/O devices, which are different, similar and/or identical to the I/O gateway 140, may be coupled to the controller 110 to enable additional groups of smart field devices, which may be Foundation Fieldbus devices, HART devices, etc., to communicate with the controller 110. In addition to the example smart field devices 130-132, one or more non-smart field devices 133 and 134 may be communicatively coupled to the example controller 110. The example non-smart field devices 133 and 134 of FIG. 1 may be, for example, conventional 4-20 milliamp (mA) or 0-10 volts direct current (VDC) devices that communicate with the controllers 110 and 111 via respective links. While not shown in FIG. 1, the example controller 111 is also coupled to similar and/or different field devices and/or I/O gateways.

The example controllers 110 and 111 of FIG. 1 may be, for example, a DeltaV™ controller and/or a DeltaV Characterization Module (Charms) I/O card sold by Fisher-Rosemount Systems, Inc., an Emerson Process Management company. However, any other controller(s) could be used. Further, while two controllers 110 and 111 are shown in FIG. 1, additional controllers of any desired type and/or combination of types could be coupled to the LAN 125. In any case, the example controllers 110 and 111 perform, carry out and/or implement one or more process control routines associated with the process control system 100 that have been generated by a system engineer and/or other system operator using the operator station 115 and which have been downloaded to and/or instantiated in the controllers 110 and 111.

To configure the control components of the example process control system 100 (e.g., the example controllers 110 and 111, the example operator station 115, the example workstation 120, the example I/O gateway 140 and/or the example field devices 130-134), the example process control system 100 of FIG. 1 includes a process control system configuration subsystem 150. The example configuration subsystem 150 of FIG. 1 loads, configures, commissions and/or programs the actual (i.e., physical) process control components of the process control system 100 based on an operation database 155. The example configuration subsystem 150 and the example operation database 155 of FIG. 1 are a part of the DeltaV process control system sold by Fisher-Rosemount Systems, Inc., an Emerson Process Management company. The example operation database 155 of FIG. 1 is generated, defined, specified and/or populated using other tools and/or interfaces (not shown) of the DeltaV process control system.

To automatically configure replacements for any or all of the example field devices 130-134, the example controllers 110 and 111 of FIG. 1 each include a device replacer 160. While each of the example controllers 110 and 111 of FIG. 1 include the example device replacer 160, not all controllers of a process control system need to include and/or implement the device replacer 160. An example manner of implementing the example device replacers 160 of FIG. 1 is described below in connection with FIG. 2.

Figure 2:
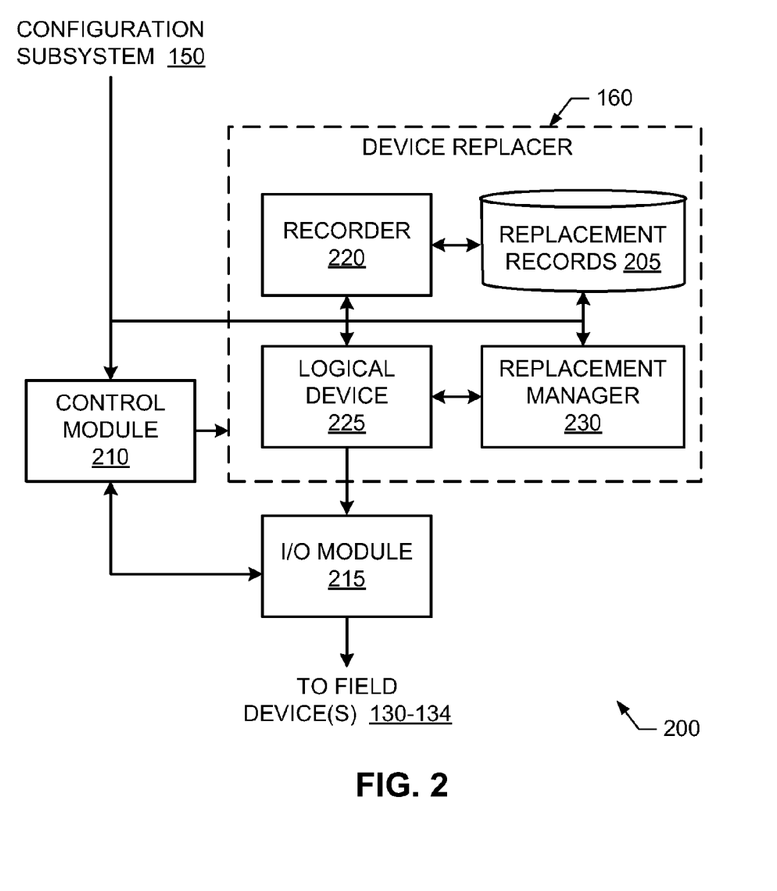
FIG. 2 illustrates an example manner of implementing any or all of the example controllers of FIG. 1.

The example device replacers 160 of FIG. 1 record configuration information sent by the configuration subsystem 150 to the field devices 130-134 during field device commissioning. Example configuration information includes, but is not limited to, auto-commissioning data, calibration data, configuration data, and/or physical to logical device mapping placeholders. The example device replacers 160 also record response information returned by the field devices 130-134 to the configuration subsystem 150. The device replacers 160 further record the amount of elapsed time between recorded information. Alternatively, the device replacers 160 may record timestamps corresponding to when information was recorded. The device replacers 160 save the recorded configuration, response and timing information as a device replacement record in a replacement records database 205 (FIG. 2). Each device replacement record represents the information and communication timings needed to configure a replacement for the associated field device and to verify the configuration of the replacement field device. Because different field devices may use different configuration and/or response data structures, device replacement records may be stored opaquely in their native format. In some examples, the example configuration subsystem 150 sends a first command to a controller 110, 111 to start recording of configuration, response and timing information by the device replacer 160 and sends a second command to stop the recording of the configuration, response and timing information.

When a replacement field device is connected to and/or detected by one of the process controllers 110 and 111, the device replacer 160 associated with that process controller 110, 111 may automatically configure and/or commission the replacement field device without needing to consult the configuration subsystem(s) 150 and/or a user of the process control system 100. The device replacer 160 locates and retrieves an associated device replacement record, and plays back the recorded configuration information to commission, configure and/or otherwise setup the replacement field device. The device replacer 160 uses the recorded response information stored in the device replacement record to ascertain whether the configuration of the replacement field device is successful. If configuration of the replacement field device completes correctly, the device replacer 160 notifies the appropriate subsystem(s) of the process control system 100 of the newly configured replacement field device. If the device replacement record is not found or automatic configuration does not complete as expected, the device replacer 160 notifies the appropriate subsystem(s) of the detected replacement field device and that automatic configuration was not successfully completed. Additionally or alternatively, such notifications may be stored in and/or added to an event log. Further, in some examples, a user of the operator station 115 and/or the workstation 120 is notified of the field device replacement before the replacement field device is automatically configured. The user may acknowledge the notification and/or indicate that the replacement field device is not to be automatically configured.

In some examples, the process controller 110 records the configuration, response and timing information for a particular field device (e.g., the field device 133), and the process controller 111 detects and commissions a replacement for that field device. In such examples, the device replacer 160 associated with the process controller 111 queries the device replacer 160 associated with the process controller 110 to obtain the recorded information for the replacement field device when the recorded information is not locally available at the process controller 111.

While FIG. 1 illustrates an example process control system 100 within which the example apparatus, methods, and articles of manufacture to automatically replace field devices of a process plant control system may be advantageously employed, persons of ordinary skill in the art will readily appreciate that the apparatus, methods, and articles of manufacture described herein may, if desired, be advantageously employed in other process plants and/or process control systems of greater or less complexity (e.g., having more than two controllers, across more than one geographic location, etc.) than the illustrated example of FIG. 1. Moreover, while not shown in FIG. 1 for clarity of illustration, there may be any number and/or type(s) of additional and/or alternative devices, components and/or systems included in a process plant and/or a process control system. For example, a process plant and/or a process control system may include and/or implement a firewall, a switch, a router, a hub, a power supply, and/or any other devices managed and/or controllable by a process control system, such as the DeltaV process control system sold by Fisher-Rosemount Systems, Inc., an Emerson Process Management company.

While the example process control system 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example controllers 110, 111, the example operator station 115, the example workstation 120, the example field devices 130-134, the example I/O gateway 140, the example configuration subsystem 150 and/or the example device replacers 160 may be implemented by hardware, software, firmware and/or any combination of hardware, software and/or firmware. Thus, for example, any of the example controllers 110, 111, the example operator station 115, the example workstation 120, the example field devices 130-134, the example I/O gateway 140, the example configuration subsystem 150 and/or the example device replacers 160 may be implemented by the example processor platform P100 of FIG. 7 and/or one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), fuses, etc. When any apparatus claim of this patent incorporating one or more of these elements is read to cover a purely software and/or firmware implementation, at least one of the example controllers 110, 111, the example operator station 115, the example workstation 120, the example field devices 130-134, the example I/O gateway 140, the example configuration subsystem 150 and/or the example device replacers 160 hereby expressly defined to include a tangible article of manufacture such as a tangible computer-readable medium storing the firmware and/or software. As used herein, the term tangible computer-readable medium is expressly defined to include any type of computer-readable medium and to expressly exclude propagating signals. As used herein, the term non-transitory computer-readable medium is expressly defined to include any type of computer-readable medium and to exclude propagating signals. Example tangible and/or non-transitory computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 7. Further still, the example process control system 100 may include interfaces, data structures, elements, processes and/or devices instead of, or in addition to, those illustrated in FIG. 1 and/or may include more than one of any or all of the illustrated interfaces, data structures, elements, processes and/or devices.

FIG. 2 illustrates an example manner of implementing the example device replacers 160 and/or, more generally, the example controllers 110 and 111 of FIG. 1. While either of the example controllers 110 and 111 of FIG. 1 may be represented by the illustrated example of FIG. 2, for ease of discussion the example device depicted in FIG. 2 will be referred to as controller 200. To perform, carry out and/or implement one or more process control routines associated with the example process control system 100, the example controller 200 of FIG. 2 includes a control module 210. To communicatively couple the control module 210 and/or the example device replacer 160 to the field devices 130-134, the example controller 200 includes an I/O module 215. Using any number and/or type(s) of algorithm(s), parameter(s) and/or rule(s) configured by the example configuration subsystem 150 and/or based on any number and/or type(s) of inputs received from the field devices 130-134 via the I/O module 215, the example control module 210 of FIG. 1 generates and/or computes control outputs that are sent to the field device 130-134 via the I/O module 215.

To record field device configuration information, the example device replacer 160 of FIG. 1 includes a recorder 220. When a start recording command is received from the example configuration subsystem 150, the example recorder 220 of FIG. 1 starts recording configuration information sent by the configuration subsystem 150 to a field device 130-134. The example recorder 220 also starts recording response information returned by the field device 130-134 to the configuration subsystem 150. The recorder 220 further records the amount of time that elapses between recorded information. Alternatively, the recorder 220 may record timestamps corresponding to when information was recorded. The recorder 220 saves the recorded configuration, response and timing information in a device replacement record in the example replacement records database 205. The example recorder 220 continues recording and saving the configuration, response and timing information until a stop recording command is received from the configuration subsystem 150. In the illustrated example of FIG. 2, the configuration information and response information is copied to and/or directed through the device replacer 160 to enable the recorder 220 to record the configuration, response and timing information.

An example data structure 300 that may be used to implement a device replacement record is described below in connection with FIG. 3. The example replacement records database 205 of FIG. 2 may be implemented using any number and/or type(s) of memory(-ies), memory device(s) and/or storage device(s). In some examples, device replacement records are replicated to the device replacers 160 of other controllers. Additionally or alternatively, device replacement records can be purged and/or removed from the replacement records database 205 by, for example, a user of the workstation 120 and/or the operator station 115.

To playback and/or send recorded configuration information to the example field devices 130-134, the example device replacer 160 includes a logical device 225. The example logical device 225 of FIG. 2 implements one or more interfaces that are compatible with different types of field devices to allow the example device replacer 160 to send recorded configuration information to the field devices 130-134 and to receive response information from the field devices 130-134. The example logical device 225 sends recorded configuration information to a replacement for a particular field device 130-134 based on the recorded timing information for that replaced field device 130-134. For example, if two pieces of configuration information were recorded one second apart, the example logical device 225 sends those two pieces of configuration information to the replacement field device one second apart. The example logical device 225 of FIG. 2 also detects and notifies a replacement manager 230 when any of the example field devices 130-134 is replaced.

To control the configuration and/or commissioning of replacement field devices, the example device replacer 160 of FIG. 2 includes the example replacement manager 230. When the example logical device 225 detects a replacement field device and notifies the device replacer 160, the example replacement manager 230 of FIG. 2 queries the replacement records database 205 to locate a device replacement record associated with the replaced field device 130-134. The query of the replacement records database 205 may be performed using an identifier associated with the replaced field device 130-134. If the associated device replacement record is not found in the local replacement records database 205, the example replacement manager 230 may interact with the replacement manager 230 of other device replacers 160 to locate and/or obtain the associated device replacement record, if available. When the associated device replacement record is found, the example replacement manager 230 directs the logical device 225 to send the recorded configuration information to the replacement field device according to the associated timing information. As response information is received, the replacement manager 230 compares the received response information to recorded response information to determine whether the configuration and/or commissioning of the replacement field device is proceeding as expected. If configuration completes correctly, the replacement manager 230 notifies the appropriate subsystem(s) of the process control system 100 of the automatically configured replacement field device. If the device replacement record is not found or automatic configuration does not complete as expected, the replacement manager 230 notifies the appropriate subsystem(s) of the detected replacement field device and that automatic configuration was not successfully completed. Additionally or alternatively, such notifications may be stored in and/or added to an event log. Further, in some examples, a user of the operator station 115 and/or the workstation 120 is notified of the field device replacement before the replacement field device is automatically configured. The user may acknowledge the notification and/or indicate the replacement field device is not to be automatically configured.

While the example device replacer 160 of FIGS. 1 and 2 may be used to automatically configure any replacement field device, the configuration subsystem 150 may, additionally or alternatively, identify and/or mark one or more of the field devices 130-134 as not automatically replaceable. Moreover, when a replacement field device is automatically replaceable but an associated device replacement record does not result in a successful automatic replacement, the field device is removed from the list of automatically replaceable field devices and/or the stored device replacement record deleted and/or marked as invalid.

While an example manner of implementing the example device replacers 160 and/or, more generally, the example controllers 110 and 111 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. Further, the example replacement records database 205, the example control module 210, the example I/O module 215, the example recorder 220, the example logical device 225, the example replacement manager 230, the example device replacer 160 and/or the example controller 200 of FIG. 2 may be implemented by hardware, software, firmware and/or any combination of hardware, software and/or firmware. Thus, for example, any of the example replacement records database 205, the example control module 210, the example I/O module 215, the example recorder 220, the example logical device 225, the example replacement manager 230, the example device replacer 160 and/or the example controller 200 may be implemented by the example process platform P100 of FIG. 7 and/or one or more circuit(s), programmable processor(s), ASIC(s), PLD(s), FPLD(s), and/or FPGA(s), fuses, etc. When any apparatus claim of this patent incorporating one or more of these elements is read to cover a purely software and/or firmware implementation, at least one of the example replacement records database 205, the example control module 210, the example I/O module 215, the example recorder 220, the example logical device 225, the example replacement manager 230, the example device replacer 160 and/or the example controller 200 is hereby expressly defined to include a tangible article of manufacture such as a tangible computer-readable medium storing the firmware and/or software. Further still, the example device replacer 160 and/or the example controller 200 may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
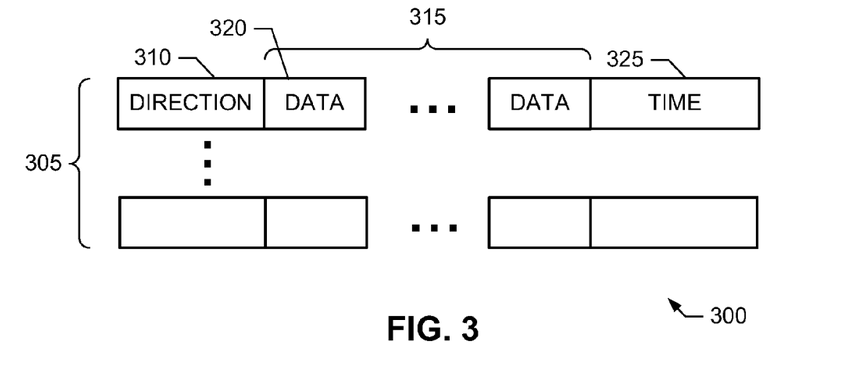
FIG. 3 illustrates an example data structure that may be used to implement the example replacement records database of FIG. 2.

FIG. 3 illustrates an example data structure 300 that may be used to implement a device replacement record of the example replacement records database 205 of FIG. 2. The example data structure 300 of FIG. 3 includes a plurality of entries 305 for respective pieces of recorded information. To identify whether the entry corresponds to configuration or response information, each of the example entries 305 of FIG. 3 includes a direction field 310. Each of the example direction fields 310 of FIG. 3 contains a flag having a first state (e.g., TRUE) corresponding to configuration information and a second state (e.g., FALSE) corresponding to response information.

To store the recorded information, each of the example entries 305 of FIG. 3 includes a plurality of data fields 315. In some examples, a first 320 of each of the example data fields 315 of FIG. 3 contains a number representing the number of data fields 315 storing the recorded information. The remaining example data fields 315 store the recorded configuration/response data.

To identify timing information, each of the example entries 305 of FIG. 3 includes a time field 325. Each of the example time fields 325 of FIG. 3 includes a value that represents, for example, the amount of time that elapsed between each pair of the entries 305 as the entries 305 were recorded by the example recorder 220 of FIG. 2.

While an example data structure 300 that may be used to implement a device replacement record of the example replacement records database 205 of FIG. 2 is illustrated in FIG. 3, the data structure 300 may be implemented using any number and/or type(s) of other and/or additional fields and/or data. Further, the fields and/or data illustrated in FIG. 3 may be combined, divided, re-arranged, eliminated and/or implemented in any way. Moreover, the example data structure 300 may include fields and/or data in addition to, or instead of, those illustrated in FIG. 3, and/or may include more than one of any or all of the illustrated fields and/or data.

Figure 4:
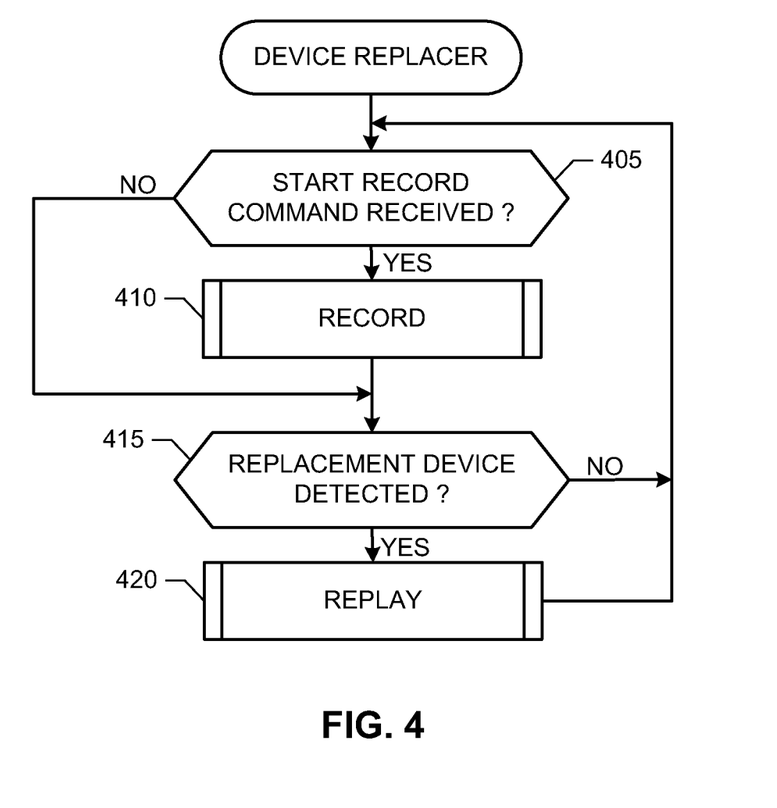
FIGS. 4, 5 and 6 are flowcharts representative of example processes that may be implemented as machine-accessible instructions and executed by, for example, one or more processors, to replace field devices in a process control system and/or to implement any or all of the example device replacers of FIGS. 1 and 2.
Figure 5:
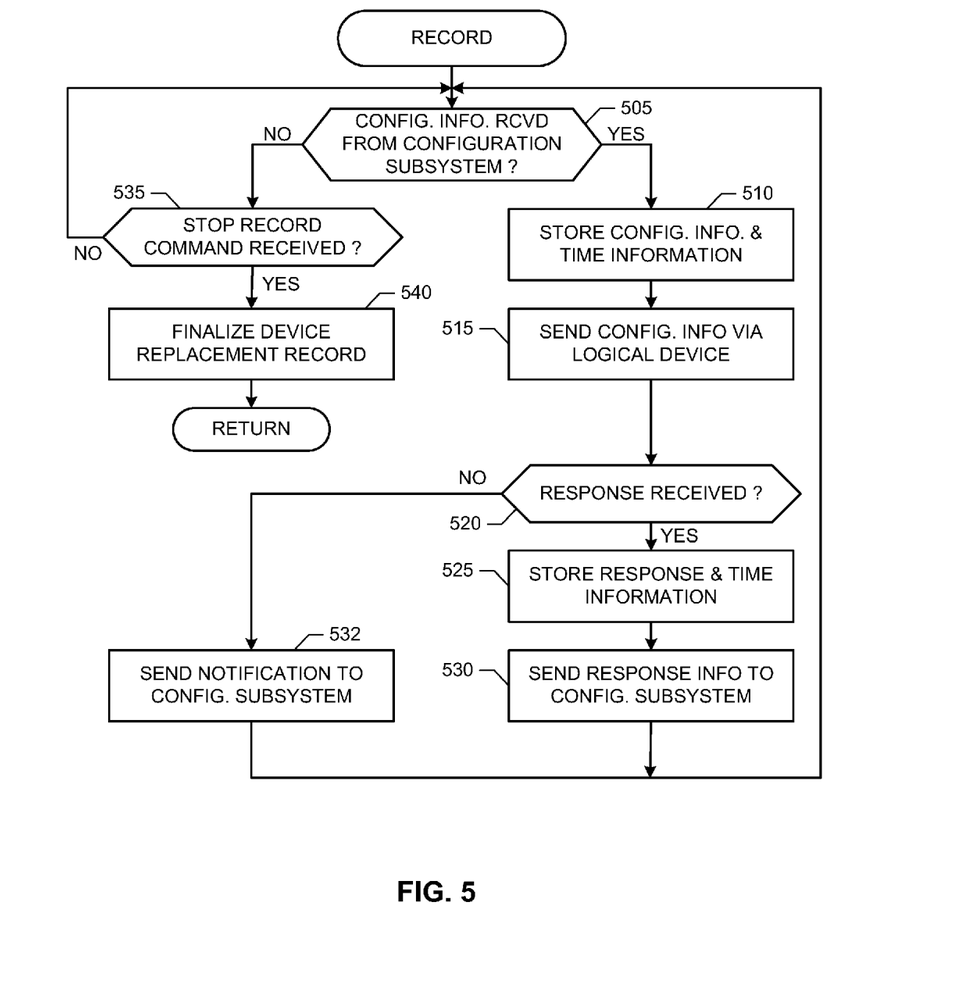
Figure 6:
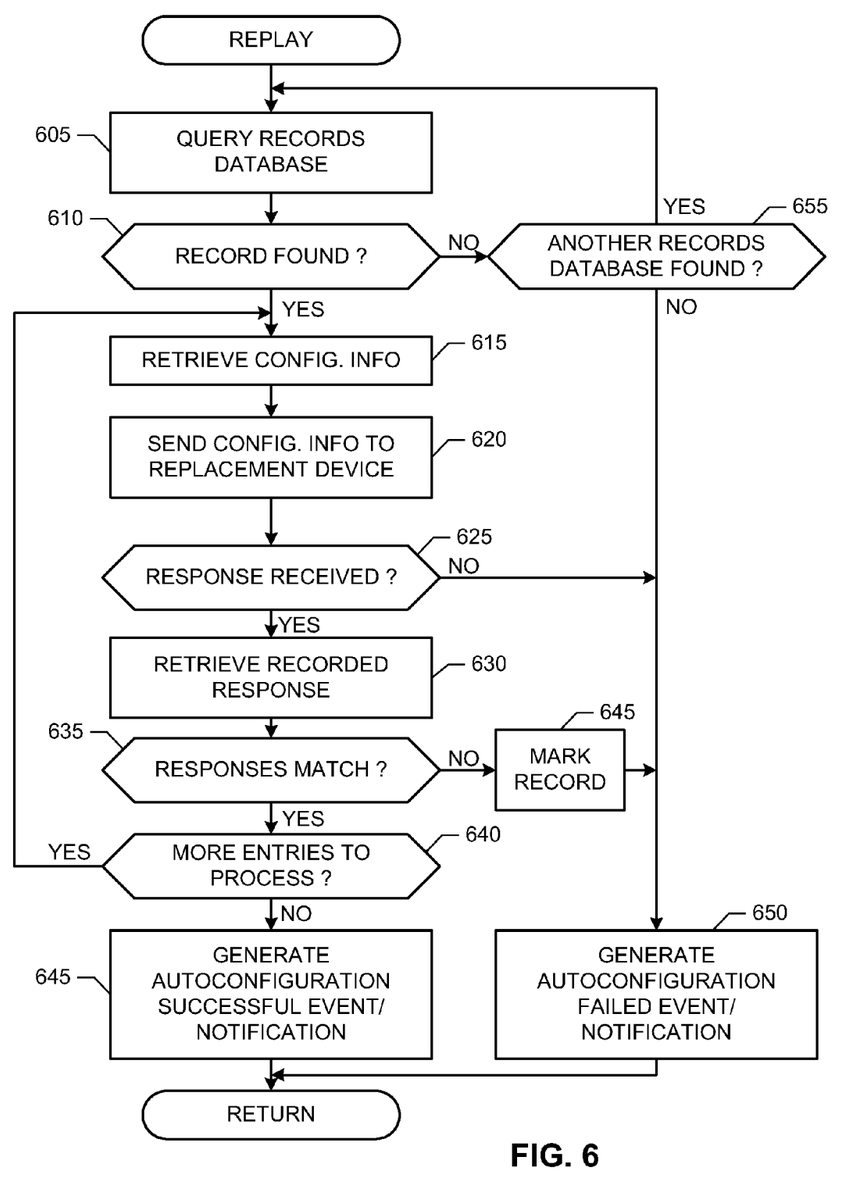

FIGS. 4, 5 and 6 illustrate example processes that may be carried out and/or embodied in machine-accessible instructions that may be executed to implement the example device replacers 160 of FIGS. 1 and 2 to replace field devices of process control systems. A processor, a controller and/or any other suitable processing device may be used, configured and/or programmed to execute the example machine-accessible instructions represented in FIGS. 4, 5 and/or 6. For example, the processes of FIGS. 4, 5 and/or 6 may be embodied in coded instructions stored on a tangible computer-readable medium. Machine-readable instructions comprise, for example, instructions that cause a processor, a computer and/or a machine having one or more processors to perform one or more particular processes. Alternatively, some or all of the example processes of FIGS. 4, 5 and/or 6 may be implemented using any combination(s) of ASIC(s), PLD(s), FPLD(s), FPGA(s), discrete logic, hardware, firmware, etc. Also, some or all of the example processes of FIGS. 4, 5 and/or 6 may be implemented manually or as any combination of any of the foregoing techniques, for example, any combination of firmware, software, discrete logic and/or hardware. Further, many other methods of implementing the example operations of FIGS. 4, 5 and/or 6 may be employed. For example, the order of execution of the blocks may be changed, and/or one or more of the blocks described may be changed, eliminated, sub-divided, or combined. Additionally, the blocks of any or all of the example processes of FIGS. 4, 5 and/or 6 may be carried out sequentially and/or carried out in parallel by, for example, separate processing threads, processors, devices, discrete logic, circuits, etc.

The example process of FIG. 4 begins with the example device replacer 160 determining whether a start record command was received (block 405). If a start record command is received (block 405), the example device replacer 160 records configuration, response and timing information (block 410) by, for example, carrying out the example process of FIG. 5. Control then proceeds to block 415 to determine whether a replacement field device was detected.

Returning to block 405, if a start record command was not received (block 405), the device replacer 160 determines whether a replacement field device was detected by the example control module 210 (block 415). If a replacement field device was detected (block 415), the device replacer 160 configures and/or commissions the replacement field device by replaying a corresponding device replacement record. An example manner of implementing the replaying the record (block 420) is described in connection with FIG. 6. Control then returns to block 405 to determine whether a record start command was received.

The example process of FIG. 5 begins with the example recorder 220 determining whether configuration information was received from the configuration subsystem 150 (block 505). If configuration information was received (block 505), the recorder 220 stores the received configuration information and timing information in the next entry 305 of the associated device replacement record (block 510). If the configuration subsystem 150 is configuring the field device 130-134 via the device replacer 160, the recorder 220 forwards the received configuration information to the field device 130-134 via the logical device 225 (block 515).

The recorder 220 waits to receive response information (block 520). When response information is received, the recorder 220 stores the received response information and timing information in the next entry 305 of the associated device replacement record (block 525). If the configuration subsystem 150 is configuring the field device 130-134 via the device replacer 160, the recorder 220 forwards the received response information to the configuration subsystem 150 (block 530). Control then returns to block 505 to check for configuration information.

If a response is not received within a suitable time period (block 520), the recorder 220 notifies the configuration subsystem 150 (block 532) and control returns to block 505 to check for configuration information. In some examples, the recorder 220 may terminate the example process of FIG. 5 upon a timeout at block 520 and delete any previously stored configuration information.

Returning to block 505, if configuration information was not received (block 505), the recorder 220 checks whether a stop record command was received (block 535). If a stop record command was not received (block 535), control returns to block 505. If a stop record command was received (block 535), the recorder finalizes and/or closes the device replacement record (block 540), and control returns from the example process of FIG. 5 to, for example, the example process of FIG. 4 at block 415.

The example process of FIG. 6 begins with the example replacement manager 230 querying the local replacement records database 205 for a device replacement record associated with the replaced field device 130-134 (block 605). If the associated device replacement record is found (block 610), the logical device 225 retrieves the first configuration information entry 305 from the record (block 615) and sends the retrieved configuration information to the replacement field device (block 620).

The replacement manager 230 waits to receive response information from the replacement field device (block 625). When response information is received (block 625), the replacement manager 230 retrieves the corresponding recorded response information from the associated device replacement record (block 630). If the received and recorded response information match (block 635), the replacement manager 230 determines whether there are more entries 305 to process (block 640). If there are more entries 305 to process (block 640), control returns to block 615. If there are no more entries 305 to process (block 640), the replacement manager 230 generates and issues and/or logs an automatic configuration of replacement field device successful notification (block 645), and control returns from the example process of FIG. 6 to, for example, the example process of FIG. 4 at block 405.

Returning to block 635, if the received and recorded response information do not match (block 635), the device replacement record is marked as invalid and/or deleted (block 645) and/or the replaced field device 130-134 marked and/or identified as not automatically replaceable. The replacement manager 230 generates and issues and/or logs an automatic configuration of replacement field device unsuccessful notification (block 650), and control returns from the example process of FIG. 6 to, for example, the example process of FIG. 4 at block 405.

Returning to block 625, if a response is not received within a suitable time period (block 625), the replacement manager 230 generates and issues and/or logs an automatic configuration of replacement field device unsuccessful notification (block 650). Control then returns from the example process of FIG. 6 to, for example, the example process of FIG. 4 at block 405.

Returning to block 610, if a device replacement record is not found (block 610), the replacement manager 230 determines whether there are other replacement record databases 205 that could be queried (block 655). If there are other replacement record databases 205 available (block 655), control returns to block 605 to query the next database 205.

If there are no other replacement record databases 205 available (block 655), the replacement manager 230 generates and issues and/or logs an automatic configuration of replacement field device unsuccessful notification (block 650) and control returns from the example process of FIG. 6 to, for example, the example process of FIG. 4 at block 405.

While the illustrated examples of FIGS. 5 and 6 assume response information is received for each piece of configuration information, fewer responses may be used and/or recorded. In such examples, the process of FIG. 5 could be modified at block 520 to check for the receipt of configuration information when response information has not yet been received, and the process of FIG. 6 could be modified at block 625 to only wait for and check response information if the next entry 305 of the identified device replacement record corresponds to response information (e.g., the direction field 310 contains FALSE).

While the illustrated example of FIG. 6 proceeds without notifying a user of the operator station 115 and/or the workstation 120, the replacement manager 210 may alternatively notify the user of the operator station 115 and/or the workstation 120 after the device replacement record is found (e.g., after block 610) but before automatic configuration of the replacement field device begins. The user may then acknowledge the notification to indicate that the example process of FIG. 6 is to continue, or indicate the replacement field device is not to be automatically configured and, thus, the example process of FIG. 6 is to terminate.

Figure 7:
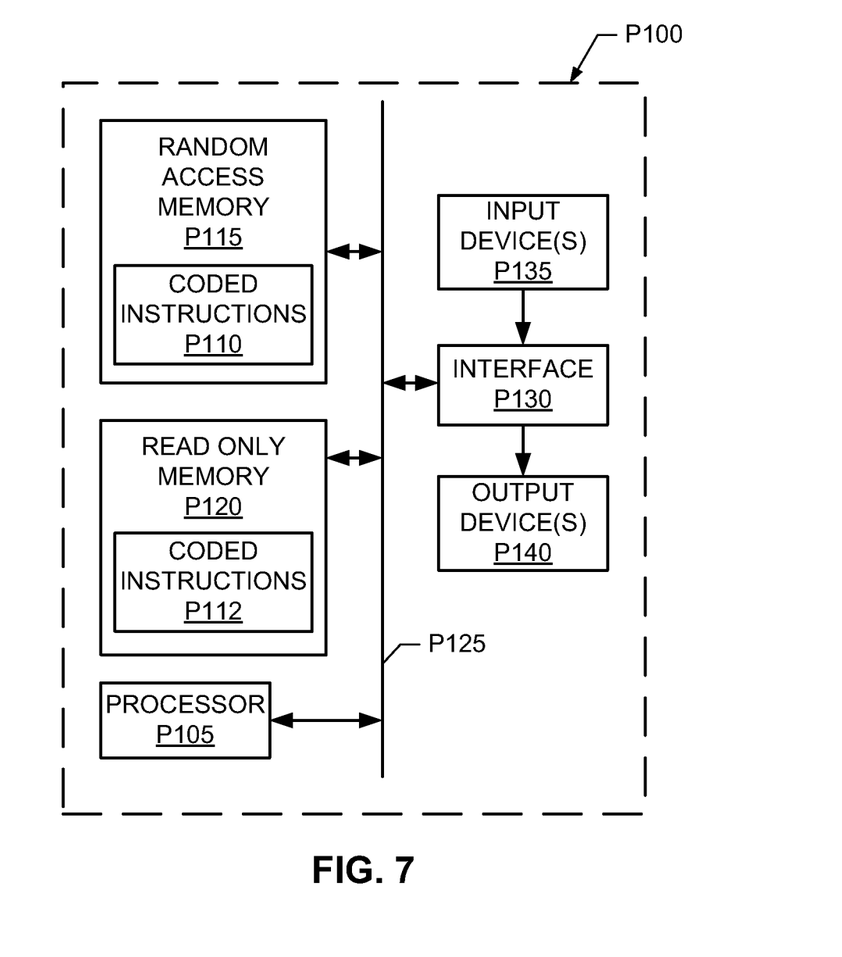
FIG. 7 is a schematic illustration of an example processor platform that may be used and/or programmed to carry out the example machine-accessible instructions of FIGS. 4, 5 and/or 6 to replace field devices in a process control system.

FIG. 7 is a schematic diagram of an example processor platform P100 that may be used and/or programmed to perform the processes represented by FIGS. 4, 5, and/or 6 to implement the example device replacers 160 described herein. One or more general-purpose processors, processor cores, microcontrollers, etc may be used to implement the processor platform P100.

The processor platform P100 of the example of FIG. 7 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4, 5, and/or 6 to replace field devices of process control systems. Thus, the coded instructions P110, P112 may include the instructions of FIGS. 4, 5, and/or 6.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device. The ROM P120 may be implemented by flash memory and/or any other desired type of memory device. Access to the memory P115 and the memory P120 may be controlled by a memory controller. The example memory P115 may be used to, for example, implement the example replacement records database 205 of FIG. 2.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The example input and output devices P135 and P140 may be used, for example, to implement the I/O module 215 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method, comprising:
storing a device commissioning process associated with a first field device by:
recording, at a first process controller of a process control system, first and second configuration data transmitted between a configuration system of the process control system and the first field device during commissioning of the first field device;
recording, at the first process controller, an amount of time elapsed between recording of the first configuration data and recording of the second configuration data;
detecting, at a second process controller of the process control system, replacement of the first field device with a second field device; and
playing back the stored device commissioning process to commission the second field device based on the recorded amount of time by:
sending the first recorded configuration data from the second process controller to the second field device; and
after the recorded amount of time has passed since the sending of the first recorded configuration data, sending the second recorded configuration data from the second process controller to the second field device.

2. A method as defined in claim 1, further comprising:
receiving, at the second process controller of the process control system, first response data from the second field device; and
comparing the first response data to second response data recorded during commissioning of the first field device to verify the commissioning of the second field device.

3. A method as defined in claim 2, further comprising, when the first and second response data do not match, generating a notification that the configuration system was unable to properly commission the second field device.

4. A method as defined in claim 1, wherein the first process controller is different from the second process controller.

5. A method as defined in claim 4, further comprising sending a query from the second process controller to the first process controller to obtain the first and second recorded configuration data.

6. A method as defined in claim 1, wherein recording the amount of time comprises storing the amount of time in a data entry corresponding to the second recorded configuration data.

7. A method as defined in claim 1, further comprising:
starting recordation of the first configuration data when a first command is received from the configuration system; and
stopping recordation of the first configuration data when a second command is received from the configuration system.

8. A method as defined in claim 1, wherein a user configures the configuration system to commission the first field device.

9. A process controller of a process control system, comprising:
a recorder to record first and second configuration data exchanged between a first field device and a configuration system of the process control system during a commissioning of the first field device, the recorder to record an amount of time elapsed between the recordation of the first configuration data and the recordation of the second configuration data during the commissioning of the first field device;
a logical device to detect replacement of the first field device with a second field device; and
a replacement manager to send the first and second recorded configuration data to the second field device when the replacement is detected to commission the second field device, wherein the replacement manager is to separate the sending of the second recorded configuration data and the sending of the first configuration data by the recorded amount of time elapsed between the recordation of the first configuration data and the recordation of the second configuration data.

10. A process controller as defined in claim 9, wherein the first configuration data comprises first response data sent by the first field device to the configuration system during the commissioning of the first field device, and the replacement manager is to compare the first response data to second response data received from the second field device during the commissioning of the second field device.

11. A process controller as defined in claim 9, wherein the replacement manager is to store the amount of time in a data entry corresponding to the second recorded configuration data.

12. A process controller as defined in claim 9, wherein the recorder is to start recordation of the first configuration data when a first command is received from the configuration system and stop recordation of the first configuration data when a second command is received from the configuration system.

13. A process controller as defined in claim 9, further comprising at least one of a memory, a memory device, or a storage device to store the recorded configuration data.

14. A process controller as defined in claim 9, further comprising a control module to implement a process control routine for the first field device.

15. A process controller as defined in claim 9, further comprising an input/output module to communicatively couple the process controller to the first and second field devices.

16. A processor controller as defined in claim 9, wherein the first configuration data comprises a first instruction sent by the configuration system to the first field device, and the second configuration data comprises a second instruction sent by the configuration system to the first field device.

17. A tangible computer-readable memory comprising instructions that, when executed, cause a process controller of a process control system to at least:
record first and second configuration data sent to a first field device by a configuration system of a process control system during commissioning of the first field device;
record an amount of time elapsed between a first time at which the first configuration data was recorded and a second time at which the second configuration data was recorded;
detect replacement of the first field device with a second field device;
send the first recorded configuration data to the second field device when the replacement is detected to commission the second field device; and
send the second recorded configuration data to the second field device after the amount of time elapses from the sending of the first recorded configuration data.

18. A computer-readable memory as defined in claim 17, wherein the machine readable instructions, when executed, cause the process controller to compare a first response received from the first field device during the commissioning of the first field device to a second response received during commissioning of the second field device to verify proper commissioning of the second field device.

19. A computer-readable memory as defined in claim 17, wherein the machine readable instructions, when executed, cause the process controller to:
   start recording the first configuration data when a first command is received from the configuration system; and
   stop recording the first configuration data when a second command is received from the configuration system.

* * * * *